United States Patent [19]

Carlick et al.

[11] 3,876,432

[45] Apr. 8, 1975

[54] FATTY ESTER MODIFIED EPOXY RESIN PHOTOPOLYMERIZABLE COMPOSITIONS

[75] Inventors: Daniel J. Carlick, Livingston; Ralph H. Reiter, Wayne; Ronald Saltzman, Morris Plains; Arnold H. Gruben, Cedar Grove, all of N.J.

[73] Assignee: Sun Chemical Corporation, New York, N.Y.

[22] Filed: Oct. 3, 1974

[21] Appl. No.: 511,573

Related U.S. Application Data

[63] Continuation-in-part of Ser. Nos. 288,113, Sept. 11, 1972, abandoned, and Ser. No. 288,114, Sept. 11, 1972, abandoned.

[52] U.S. Cl. ............... 96/115 P; 96/115 R; 117/38; 117/47 A; 117/75; 117/76 F; 117/76 P; 117/93.31; 117/94; 117/124 E; 117/132 BE; 117/138.8 F; 117/138.8 A; 117/138.8 F; 117/101 UN; 117/161 UA; 117/161 Z; 161/190; 161/247

[51] Int. Cl. ........ G03c 1/68; C08d 1/00; C08f 1/16

[58] Field of Search .................. 204/159.19, 159.23; 260/23 EP, 23 TN; 117/93.31, 161 UN, 161 UA, 161 Z; 96/115 P, 115 R

[56] References Cited

UNITED STATES PATENTS

| | | | |
|---|---|---|---|
| 3,373,221 | 3/1968 | May | 260/837 R |
| 3,663,484 | 5/1972 | Broecker et al. | 260/23 TN |
| 3,673,140 | 6/1972 | Ackerman et al. | 204/159.19 |

*Primary Examiner*—John C. Bleutge
*Assistant Examiner*—Richard B. Turer
*Attorney, Agent, or Firm*—Cynthia Berlow

[57] ABSTRACT

A solvent-free printing ink or coating composition vehicle which is curable by exposure to a source of radiation comprises (1) the reaction product of the alcoholysis of a fatty acid ester oil-modified epoxy resin or a fatty alkyl ester-modified epoxy resin with an ethylenically unsaturated acid and (2) a photoinitiator. The reaction product may be further modified by reaction with an end-capping agent. Formulations containing these vehicles may also include additional monomeric ethylenically unsaturated esters.

8 Claims, No Drawings

FATTY ESTER MODIFIED EPOXY RESIN PHOTOPOLYMERIZABLE COMPOSITIONS

This application is a continuation-in-part of copending applications Ser. No. 288,113 (filed Sept. 11, 1972) now abandoned and Ser. No. 288,114 (filed Sept. 11, 1972) now abandoned.

This invention relates to photopolymerizable compositions. More particularly it relates to photopolymerizable solvent-free vehicles for printing inks and coating compositions that comprise esters of fatty acid ester oil-modified epoxy resins or fatty alkyl ester-modified epoxy resins and derivatives thereof.

The use of photopolymerizable ethylenically unsaturated monomeric materials in coating compositions, adhesives, printing inks, and the like is known. It is also known that such monomeric materials are converted into polymers by the action of radiation and that they will polymerize at an improved rate when exposed to radiation in the presence of a photoinitiator and/or a photosensitizer. Most ethylenically unsaturated monomeric materials, however, are relatively poor carriers for pigment and are difficult to utilize as printing inks and paint vehicles.

Products of the reaction of epoxy resins and carboxylic acids have been disclosed in, for example, U.S. Pat. Nos. 3,373,075 and 3,308,076 and of the reaction of epoxy resins and drying oil acids in, for example, U.S. Pat. No. 2,698,308.

Radiation-curable acrylated epoxidized drying oils also are known, as disclosed in, for example, British Pat. No. 1,241,851. The products disclosed therein are prepared by reacting with a alpha, beta-unsaturated monocarboxylic acid having 3 to 7 carbon atoms an epoxidized triglyceride wherein the unsaturation present in the fatty acyl radical of the oil has been substantially converted to oxirane groups of the type

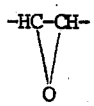

Acrylation of the epoxidized triglyceride converts these oxirane groups to groups of the type

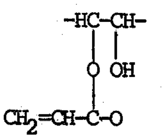

The products are uniformly acrylated resins that are curable only through the acrylate moiety. They are very reactive monomeric materials which polymerize at room temperature and form useless gels within a week when stored at room temperature. The addition to these compositions of known stabilizers diminishes the sensitivity of the esters to ionizing radiation. Their useful life can be prolonged if they are stored under refrigeration or if they are stabilized with certain furan compounds which are the subject of U.S. Pat. No. 3,600,290.

The photopolymerizable compositions of the present invention are based on polyethylenically unsaturated esters of modified epoxy resins which are prepared by the steps of (1) reacting an hydroxyl glycidyl ether resin with (a) a fatty acid ester oil or (b) a lower alkyl ester of a fatty acid in the presence of a basic alcoholysis catalyst and then (2) reacting the thus-modified epoxy resin, for example

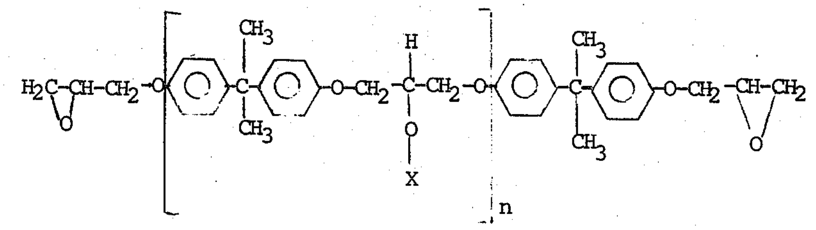

wherein X is a residue of a fatty acid ester oil or a lower alkyl ester of a fatty acid and $n$ is an integer of about 0.5 to 50, and preferably about 1 to 20, with an $\alpha,\beta$-ethylenically unsaturated acid.

Esterification of the modified epoxy resin converts the terminal glycidyl groups

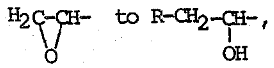

wherein R is the residue of the ethylenically unsaturated acid; it is attached to the ends of the molecule and the residue of the fatty acid ester oil or the fatty alkyl ester is attached internally along the backbone of the epoxy resin. This internal residue remains intact with regard to its unsaturation, thus enabling the resin to cure both by free radical polymerization and by allylic auto-oxidation.

These products contain residual hydroxyl groups which can be capped by further reaction with, for example, isocyanates, anhydrides, dialkyl sulfates, diazo compounds, or other labile hydrogen scavengers.

The compositions of this invention are particularly useful as lithographic ink vehicles, since they have, for example, good pigment wetting and printing properties. They are compatible with the printing plates used in lithography; because of their dual curing mechanism, they give tougher ink films at higher pigment loading than do products which cure only via acrylate polymerization; and the compositions post-cure via oxidation on aging which purely acrylated products cannot. The fatty acid oil or ester modification is important in satisfying the transfer requirements of ink and contributes to the rub- and scratch-resistance of the final film. Furthermore, the ink and coating compositions are stable and can be stored for long periods of time under ambient conditions.

The solvent-free photopolymerizable vehicles for printing inks and coatings of this invention have the general structure

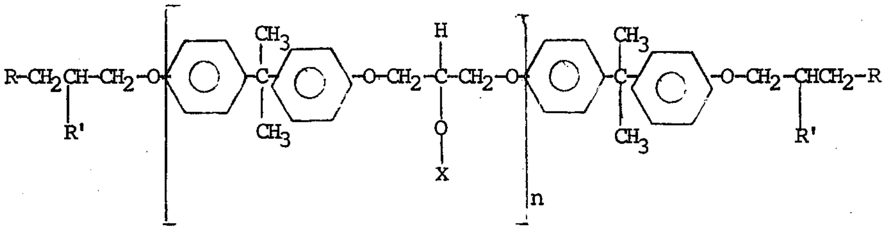

wherein R is an ethylenically unsaturated aliphatic or aliphatic/aromatic radical, either straight chain or branched chain; R′ is —OH,

—NH—C(=O)—R″, —O—C(=O)—R″,

—OR″, or the like; R″ is a lower alkyl or aryl radical; X is a residue of a lower alkyl ester of a fatty acid or a fatty acid ester oil; and $n$ is an integer of about 0.2 to 50, and preferably is about 1 to 20.

The starting resins are alcohols which contain terminal epoxy or glycidyl groups as well as intermediate esterifiable hydroxyl groups and which are produced from dihydric phenols by reaction with epichlorhydrin in alkaline solution or by the reaction of dihydric phenols with diepoxides to produce polyether derivatives of the dihydric phenol having terminal aliphatic epoxy groups.

The dihydric phenol may be mononuclear, such as for example resorcinol, or it may be polynuclear, such as for example bisphenol (p,p′-dihydroxydiphenyldimethyl methane) and other dihydroxydiaryldialkyl methanes, 1,5-dihydroxy naphthalene, etc.

The glycidyl ethers or epoxy resins may be produced from the dihydric phenols by heating with epichlorhydrin in the presence of caustic alkali, using more than 1 mol of epichlorhydrin per mol of the dihydric phenol and up to about 2 mols of epichlorhydrin per mol of dihydric phenol and using an amount of caustic alkali somewhat in excess of that equivalent to the epichlorhydrin. The heating is continued to convert the product into a mixture of glycidyl ethers or epoxy ethers. The principal product may be represented by the following formula:

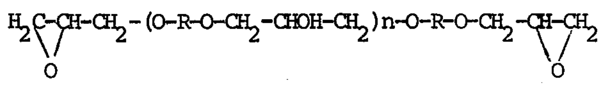

where R is the divalent hydrocarbon radical of the dihydric phenol and $n$ is 1, 2, 3, etc.

The length of the chain and the extent of polymerization can be varied by changing the molecular proportions of epichlorhydrin and dihydric phenol. By decreasing the molecular ratio of epichlorhydrin to dihydric phenol from 2 epichlorhydrin to 1 dihydric phenol toward a ratio of 1 epichlorhydrin to 1 dihydric phenol, the molecular weight and the softening point of the epoxy resin or glycidyl ether is increased.

In general these epoxy ethers or glycidyl ethers contain terminal epoxide groups and have alternating intermediate aliphatic hydroxyl-containing and aromatic nuclei linked through ether oxygen and with terminal epoxide-containing aliphatic groups.

The polyhydric epoxy resins also include the reaction product of dihydric phenols with diepoxides such as diglycidyl ether, butadiene diepoxide, and the diepoxides and polyepoxides resulting from the reaction of polyhydric alcohol such as glycerol, etc., with epichlorhydrin to produce polychlorhydrin ethers of the polyhydric alcohol and by dehydrogenation of the polychlorhydrin ethers, e.g., with sodium aluminate, such epoxy resins also containing alternating aromatic and aliphatic nuclei or groups united through ether oxygen.

The oils suitable for reaction with the epoxy resins may be any saturated, monounsaturated, or polyunsaturated fatty ester oils and include linseed oil, tung oil, safflower oil, castor oil, coconut oil, cottonseed oil, oiticica oil, dehydrated castor oil, perilla oil, menhaden oil, corn oil, olive oil, and the like, and mixtures thereof. Alternatively, lower alkyl esters of fatty acids may be utilized, such as for example, methyl linoleate, butyl linoleate, propyl linoleate, methyl linolenate, methyl eleosterate, methyl oleate, methyl ricinoleate, methyl erucate, methyl laurate, methyl myristate, methyl caproate, ethyl palmitate, ethyl stearate, and the like, and their mixtures.

The catalyst for the alcoholysis reaction may be any conventional transesterification catalyst used in a conventional amount. Examples include, but are not limited to, litharge; sodium benzoate; titanium and sodium methoxide and other alkoxides; calcium oxides; lithium oxides; acetates, such as sodium acetate, calcium acetate, and potassium acetate; and the like; and their mixtures.

The epoxy resin and the fatty acid ester oil or the lower alkyl ester of a fatty acid are reacted in the ratio of about 10 to 90 parts by weight of the resin to about 90 to 10 parts by weight of the oil or ester; the amounts are preferably within the range of about 30 to 80:70 to 20.

The reaction is suitably carried out at a temperature at which there is little or no polymerization of the fatty esters or the oils. Generally the temperature is about 150° to 250°C., and preferably it is within the range of about 180° to 230°C.

The above transesterification reaction takes place with the hydroxyl groups of the epoxy resins, leaving the terminal glycidyl groups substantially unreacted.

In the second step, the product of the transesterification reaction of the epoxy resin and the oil or the alkyl ester of a fatty acid is further reacted with an ethylenically unsaturated acid having about 3 to 9 carbon atoms, thus esterifying the terminal glycidyl groups. Suitable acids include, but are not limited to, acrylic acid; methacrylic acid; ethacrylic acid; the half esters of itaconic acid, maleic acid, and fumaric acid; sorbic acid; β-phenylacrylic acid; α-cyanoacrylic acid; cinnamic acid; and the like, and mixtures of these. The unsaturated acid reactants are generally used in amounts ranging from about 0.50 to 1.00 stoichiometric equivalent based on the epoxide content.

This esterification reaction takes place generally, but not necessarily, in the presence of a catalyst such as for example a tertiary amine, e.g., N,N-benzyldimethylamine, triethylamine, tripropylamine, triamylamine, amyldimethylamine, and amyldiethylamine; a quaternary ammonium hydroxide, e.g., benzyl trimethyl ammonium hydroxide; potassium hydroxide; stannous octoate; ethylmethylimidazole; and the like; and mixtures thereof.

This reaction is generally carried out between 80° and 140°C., and preferably between about 115° and 130°C. If desired, about 50 to 100 parts per million of an inhibitor such as for example paramethoxyphenol, hydroquinone, or the methyl ester of hydroquinone may be included.

The product of this reaction is essentially the ester of the modified epoxy resin mixed with (a), when the epoxy resin is modified with a fatty acid ester oil, unreacted oil, monoglycerides, and diglycerides or (b), when the epoxy resin is modified with a lower alkyl ester of a fatty acid, unreacted fatty acid alkyl ester.

The esterified fatty acid ester oil-or fatty acid alkyl ester-modified epoxy resins prepared in the above manner may be cured in air when exposed to a source of radiation, curing both by free radical ester polymerization and by allylic auto-oxidation. The product forms a tough flexible film which makes it particularly useful for printing inks and coatings.

The esterified compounds may be further modified by reacting them with such hydroxyl-capping compounds as isocyanates, anhydrides, dialkyl sulfates, aryldiazonium salts, acyl chlorides, or other material capable of reacting with the active hydrogen of the hydroxyl group.

Examples of suitable end-capping reactants include, but are not limited to, organic aliphatic, cycloaliphatic, heterocyclic, and aromatic mono- and polyisocyanates such as for example methyl isocyanate, 6-ethyldecyl isocyanate, octadecyl isocyanate, phenyl isocyanate, chlorophenyl isocyanate, stearyl isocyanate, cyclohexyl isocyanate, 6-phenyldecyl isocyanate, 6-cyclohexyldodecyl isocyanate, 2,4-tolylene diisocyanate, 2,6-tolylene diisocyanate, 1,4-phenylene diisocyanate, hexamethylene diisocyanate, 1,5-naphthalene diisocyanate, 4,4′-diphenylmethane diisocyanate, butylene-1,4-diisocyanate, ethylene diisocyanate, trimethylene diisocyanate, tetramethylene-1,4-diisocyanate, butylene-2,3-diisocyanate, cylcohexylene-1,2-diisocyanate, methylene-bis (4-phenylisocyanate), diphenyl-3,3′-dimethyl-4,4′-diisocyanate, cyclohexane-1,4-diisocyanate, 1-methoxyphenyl-2,4-diisocyanate, benzene-1,2,4-triisocyanate, polymethylene polyphenylisocyanate, toluene-2,4,6-triisocyanate, chlorendic anhydride, maleic anhydride, acetic anhydride, propionic anhydride, trichloroacetic anhydride, α-chloroacetic anhydride, phthalic anhydride, tetrachlorophthalic anhydride, ethylene oxide, propylene oxide, dimethylsulfate, diethylsulfate, acetyl chloride, propionyl chloride, benzoyl chloride, and the like, and their mixtures.

The amounts of the reactants and the reaction temperature depend upon the specific reactants; in general the reaction takes place at a temperature within the range of about 10° to 150°C., and preferably is about 40° to 110°C.

While these esters of modified epoxy resins photopolymerize at satisfactory rates in the absence of photoinitiating additives, their photocuring rates can be increased by addition thereto of a photoinitiator or photosensitizer. Examples of suitable photoinitiators include, but are not limited to, the following: acyloins such as benzoin; acyloin derivatives such as benzoin methyl ether, benzoin ethyl ether, desyl bromide, desyl chloride, desyl amine, and the like; ketones such as benzophenone, acetophenone, ethyl methyl ketone, cyclopentanone, benzil, caprone, benzoyl cyclobutanone, dioctyl acetone, and the like; substituted ketones such as Michler's ketone, tribromoacetophenone, and trichloroacetophenone; polynuclear quinones such as benzoquinone and anthraquinone; substituted polynuclear quinones such as 1-chloroanthraquinone, 2-methylanthraquinone, and 2,3-diphenylanthraquinone; halogenated aliphatic, alicyclic, and aromatic hydrocarbons in which the halogen may be chlorine, bromine, fluorine, or iodine, such as polyhalogenated polyphenyl resins; chlorinated rubbers, such as the Parlons (Hercules Powder Company); copolymers of vinyl chloride and vinyl isobutyl ether, such as Vinoflex MP–400 (BASF Colors and Chemicals, Inc.); chlorinated aliphatic waxes, such as Chlorowax 70 (Diamond Alkali, Inc.); perchloropentacyclodecane, such as Dechlorane+ (Hooker Chemical Co.); chlorinated paraffins, such as Chlorofin 40 (Hooker Chemical Co.) and Unichloro-70B (Neville Chemical Co.); mono- and polychlorobenzenes; mono- and polybromoxylenes; dichloromaleic anhydride; 1-(chloro-2-methyl) naphthalene; 2,4-dimethylbenzene sulfonyl chloride; 1-bromo-3-(m-phenoxyphenoxy benzene); 2-bromoethyl methyl ether; chlorendic anhydride; chloromethylnaphthyl chloride; chloromethyl naphthalene; bromomethyl phenanthrene; diiodomethyl anthracene; hexachlorocyclopentadiene; hexachlorobenzene; and the like; and mixtures thereof. The ratio of the amount of the α,β -unsaturated ester of the modified epoxy resin to the photoinitiator is generally in the range of about 99:1 to about 10:90 and preferably from about 98:2 to about 50:50, depending upon the photoinitiator selected and the required speed of cure.

It is within the scope of this invention to use as inks or coatings vehicles these esters of modified epoxy resins in the presence of a photoinitiator along with other ethylenically unsaturated monomeric materials such as for example the esters disclosed in U.S. Pat. Nos. 3,551,235, 3,551,246, 3,551,311, 3,558,387, and 3,759,809, for example di- and polyacrylates, di- and polymethacrylates, di- and polyitaconates, di- and polycinnamates, and di- and polysorbates of, e.g., alkylene glycols, alkoxylene glycols, alicyclic glycols, and higher polyols such as ethylene glycol, triethylene glycol, tetraethylene glycol, tetramethylene glycol, butanediols, pentanediols, hexanediols, octadiols, trimethylolethane, trimethylolpropane, pentaerythritol, dipentaerythritol, sorbitol, and the like and modifications and mixtures thereof. It is also within the scope of this invention to use monoesters, preferably of high molecular weight, as reactive diluents. These include, for example, hydroxyethyl acrylate, hydroxyethyl methacrylate, and hydroxyhexyl acrylate. When such combinations are employed, the amounts may range from about 10 to 90 parts by weight of the ester of the modified epoxy resin to about 90 to 10 parts by weight of the second monomeric material, and preferably the amount ranges from about 30 to 60:70 to 40.

When used as vehicles for inks, e.g., printing inks, the compound may be pigmented with any of a variety of conventional organic or inorganic pigments, e.g., molybdate orange, titanium white, chrome yellow, phthalocyanine blue, and carbon black, as well as colored with dyes in a conventional amount. For example, the vehicle may be used in an amount ranging from about 20 to 99.9 percent and the amount of colorant may range from about 0.1 to 80 percent of the weight of the total composition.

Commonly known modifiers may be incorporated into the formulations using these compositions, including plasticizers; wetting agents for the colorant; leveling agents, such as lanolin, paraffin waxes, and natural waxes; slip agents, such as low molecular weight polyethylenes, microcrystalline petroleum waxes, and silicone oils; and the like. Such modifiers are generally used in amounts ranging up to about 3 percent by weight, preferably about 1 percent, based on the total weight of the formulation. Other resins such as rosin esters, phenol condensate-modified rosin esters, amino formaldehyde condensates, ketone-aldehyde resins, and other similar resins conventionally used in inks and coatings can be utilized to modify adhesion, toughness, and other key properties.

The formulations may be prepared in any convenient manner, such as for example in a three-roll mill, a sand mill, a ball mill, a colloid mill, or the like, in accordance with known dispersion techniques.

The rate at which the photopolymerizable composition will dry varies with the nature of the substrate, the specific ingredients in the composition, the concentration of the photoinitiator, the thickness of the applied film, the nature and intensity of the radiation source and its distance from the material, the presence or absence of oxygen, and the temperature of the surrounding atmosphere. Irradiation may be accomplished by any one or a combination of a variety of methods; for example, the composition may be exposed to actinic light from any source and of any type as long as it furnishes an effective amount of ultraviolet radiation, since the compositions activatable by actinic light generally exhibit their maximum sensitivity in the range of about 1,800A to 4,000A, and preferably about 2,000A to 3,800A; electron beams; gamma radiation emitters; and the like; and combinations of these. Suitable sources include, but are not limited to, carbon arcs, mercury-vapor arcs, fluorescent lamps with special ultraviolet light-emitting phosphors, argon glow lamps, photographic flood lamps, radioactive cobalt sources, and so forth.

The time of irradiation must be sufficient to give the effective dosage, and irradiation may be carried out at any convenient temperature; most suitably it is carried out at room temperature for practical reasons. Distances of the radiation source from the work may range from about ⅛ to 10 inches, and preferably about ⅛ to 6 inches.

The compositions of the present invention are suitable for use in the absence of solvents and in the presence of oxygen as vehicles for paints, lacquers, and printing inks which are capable of setting or hardening by exposure to radiation. They are suitable also as compositions and elements for the preparation of photographic images and printing plates; as adhesives for foils, films, paper, wood, foils, textiles, glass, cardboard, box board, and the like; and so forth. Stock which may be printed includes paper, clay-coated paper, and various types of box board.

The photopolymerizable compositions of the present invention may be utilized for metal coatings and particularly for metals which are to be subsequently printed. Glass and plastics may also be printed or coated, and the coatings are conventionally applied by roller or spray. Pigmented coating systems may be used for various polyester and vinyl films; glass; polymer-coated cellophane; treated and untreated polyethylene, for example in the form of disposable cups or bottles; treated and untreated polypropylene; and the like. Examples of metals which may be coated include sized and unsized tin plate, tin-free steel, black iron, copper, brass, and aluminum.

When the photopolymerizable compositions are used as adhesives, at least one of the substrates must be translucent or transparent when ultraviolet light is used. When the radiation source is an electron beam, at least one of the substrates must be capable of transmitting high energy electrons and neither is necessarily translucent to light. Typical laminations include polymer-coated cellophane to polymer-coated cellophane films, polymer-coated cellophane to polypropylene, Mylar to a metal substance such as aluminum or copper, polypropylene to aluminum, and the like.

Photopolymerizable elements prepared from the compositions of this invention comprise a support, e.g., a sheet or plate, having superimposed thereon a layer of the above-described radiation-curable material. Suitable base or support materials include metals, e.g., steel and aluminum plates; sheets; and foils; and films or plates composed of various film-forming synthetic resins or high polymers, such as addition polymers, and in particular vinyl polymers, e.g., vinyl chloride polymers; vinylidene chloride polymers; vinylidene chloride polymers; vinylidene chloride copolymers with vinyl chloride, vinyl acetate, or acrylonitrile; linear condensation polymers such as polyesters, e.g., polyethylene terephthalate; polyamides; etc. Fillers or reinforcing agents can be present in the synthetic resin or polymer bases. In addition, highly reflective bases may be treated to absorb ultraviolet light or a light absorbtive layer can be transposed between the base and photopolymerizable layer.

Photopolymerizable elements can be made by exposing to radiation selected portions of the photopolymerizable layer thereof until addition polymerization is completed to the desired depth in the exposed portions. The unexposed portions of the layer are then removed, e.g., by the use of solvents which dissolve the monomer or prepolymer but not the polymer.

The compositions described herein possess many advantages over the conventional oleoresinous and solvent-type inks and coatings. The substrate need not be pretreated or prepared in any way. The use of volatile solvents and the attendant hazards and air pollution problems are eliminated. The inks and coatings have excellent adhesion to the substrate after exposure to radiation. They have good gloss and rub-resistance and withstand temperatures as high as about 150°C. and as low as about −20°C. The printed or coated sheets can be worked and further processed immediately after exposure to the energy source.

The invention and its advantages will be better understood with reference to the following illustrative examples, but it is not intended to be limited thereto. In the examples, the parts are given by weight unless otherwise specified. Unless otherwise indicated, when the ingredient is solid at room temperature, the mixture may be heated to melt the solid ingredient, but generally not above 100°C., or it may be used in a mixture with other liquid ingredients. The atmospheric and temperature conditions were ambient unless otherwise noted.

EXAMPLE 1

A. Calcium hydroxide (0.6 part) and linseed oil (450 parts) were charged into a three-necked round bottom flask equipped with a stirrer, reflux condenser, thermometer, and inert gas inlet and heated at 230°C. under a blanket of nitrogen. 550 Parts of Epon 1001 (a Bisphenol A epichlorohydrin resin having an epoxide equivalent of 425–550, a melting point of 64°–76°C., and a Gardner-Holdt solution viscosity of C-G, available from Shell Chemical Company) was added. The temperature was held at 230°C. for 5 minutes until a clear cold pill was formed and then lowered to 125°C. and the nitrogen shut off.

0.3 Part of N,N-dimethylbenzylamine and 50 parts of glacial acrylic acid were then added, and the temperature was held at 120°C. for about 2–3 hours under an air blanket until a product with an acid number of less than 5 was obtained. The Gardner color of the product was 3 and the Gardner-Holdt viscosity at 25°C. was $Z_7$.

B. 70 Parts of the ester of part (A) was mixed with 30 parts of an 8:1 mixture of benzophenone: Michler's ketone. 0.2 Gram of the composition was rolled onto a glass slide which was then exposed to consecutive 0.1-second flashes of ultraviolet light. The composition cured in 4 seconds to a tack-free film.

EXAMPLE 2

A. 0.6 Part of calcium hydroxide and 550 parts of safflower oil were charged into a three-necked round bottom flask equipped with a stirrer, reflux condenser, thermometer, and inert gas inlet and heated at 230°C. under a blanket of nitrogen. 450 Parts of Epon 1001 (Shell Oil Co.'s Bishphenol A epichlorohydrin resin having an epoxide equivalent of 425–550, a melting point of 64°–76°C., and a Gardner-Holdt solution viscosity of C-G) was added. The temperature was held at 230°C. for 5 minutes until a clear cold pill was formed and then lowered to 125°C. and the nitrogen shut off.

0.3 Part of N,N-dimethylbenzylamine and 50 parts of glacial acrylic acid were then added, and the temperature was held at 120°C. for about 2–3 hours under an air blanket until a product with an acid number of less than 5 was obtained. The Gardner color of the product was 3, and the Gardner-Holdt viscosity at 25°C. was $Z_7$.

B. An 80:20 mixture of the ester part (A) and an 8:1 mixture of benzophenone: Michler's ketone cured by the procedure of Example 1 (B) in 2 seconds to a tack-free film.

EXAMPLE 3

A. The procedure of Example 1 was repeated except that the following ingredients were used:

| | Parts by weight |
|---|---|
| Epon 1001 | 600 |
| methyl linoleate | 400 |
| sodium benzoate | 0.45 |

—Continued

| | Parts by weight |
|---|---|
| acrylic acid | 58.4 |
| dimethylbenzyl amine | 1.6 |
| The product had the following properties: | |
| acid number | 3.6 |
| color | 3 |
| viscosity at 25°C. | $Z_5$+ |

B. An 80:20 mixture of the ester of part (A) and an 8:1 mixture of benzophenone: Michler's ketone cured by the procedure of Example 1 (B) in 5 seconds to a tack-free film.

EXAMPLE 4

The procedure of Example 1 was repeated with each of the following instead of linseed oil: tung oil, soybean oil, cottonseed oil, dehydrated castor oil, methyl esters of rosin, methyl esters of dehydrated castor oil acids, methyl esters of soybean oil acids, and ethyl esters of tung oil acids. The results were comparable.

EXAMPLE 5

The procedure of Example 1 was repeated with each of the following catalysts instead of calcium hydroxide: litharge, sodium hydroxide, sodium methoxide, potassium acetate, sodium methylate, and sodium benzoate. The results were comparable.

EXAMPLE 6

The procedure of Example 1 was repeated with each of the following epoxide resins instead of Epon 1001:

Epon 834 — a Bisphenol A epichlorohydrin resin having an epoxide equivalent of 225 to 290 and a melting point of 20° to 28°C.

Epon 1004 — a Bisphenol A epichlorohydrin resin having an epoxide equivalent of 875 to 1025.

The results were comparable.

EXAMPLE 7

The procedure of Example 1 was repeated with each of the following instead of acrylic acid: methacrylic acid, the half n-butyl ester of itaconic acid, the half n-butyl ester of maleic acid, cinnamic acid, and α-cyanoacrylic acid. The results were comparable.

EXAMPLE 8

The procedure of Example 1 was repeated with each of the following catalysts instead of dimethylbenzylamine: triethylamine, triamylamine, potassium hydroxide, ethylmethylimidazole, and stannous octoate.

The results were comparable.

EXAMPLE 9

660 Parts of the product of part (A) of Example 1 and 220 parts of toluene were charged into a three-necked round bottom flask equipped with a stirrer, reflux condenser, thermometer, and Dean-Stark decanter and heated to a temperature of 120°C. The batch was held at azeotropic conditions for 30 minutes and then cooled to 90°C. to remove latent moisture. 99 Parts of n-butyl isocyanate was added over a period of 1½ hours, holding the temperature at 90±2°C. until the infrared spectral scan at 4.45$\mu$ showed the absence of the isocyanate peak and hence complete reaction.

The product was an isocyanate-modified acrylate of a linseed oil-modified epoxy resin having the following properties: viscosity (neat at 25°C.), 1,500 poise and Hellige varnish color, 4–5.

EXAMPLE 10

The procedure of Example 9 was repeated except that the starting modified-epoxy resin ester was prepared from soybean oil instead of linseed oil. The results were comparable.

EXAMPLE 11

The procedure of Example 9 was repeated except that the starting modified-epoxy resin ester was prepared from safflower oil instead of linseed oil. The results were comparable.

EXAMPLE 12

The procedure of Example 9 was repeated with each of the following isocyanates at equivalent molar levels instead of n-butyl isocyanate: methyl isocyanate, hexyl isocyanate, cyclohexyl isocyanate, allyl isocyanate, octadecyl isocyanate, phenyl isocyanate, p-chlorophenyl isocyanate, and toluene diisocyanate. The results were comparable. Inks prepared from these products were suitable for lithographic printing applications.

EXAMPLE 13

The procedure of Example 9 was repeated except that the product of part (A) of Example 1 was reacted with each of the following instead of n-butyl isocyanate: chlorendic anhydride, maleic anhydride, phthalic anhydride, and trichloroacetic anhydride. The results were comparable.

EXAMPLE 14

A coating composition was prepared from the following:

| | Parts |
|---|---|
| product of Example 1 (A) isocyanate-modified | 58 |
| pentaerylthritol triacylate | 37 |
| benzophenone | 5 |

The composition was applied to tin-free steel and irradiated at a distance of 1½ inch from a 200-watt/inch ultraviolet lamp. It cured to a tack-free film in 6 seconds.

EXAMPLE 15

The procedure of Example 14 was repeated with each of the following monomeric materials in a 92:8 mixture with Michler's ketone; the cure speeds are listed below:

| | Cure speed, seconds |
|---|---|
| 80:20 mixture of isocyanate-modified pentaerythritol triacrylate and the diacrylate of methyl oleate-modified epoxy resin | 1 |
| 50:50 mixture of isocyanate-modified pentaerythritol triacrylate and the diacrylate of methyl oleate-modified epoxy resin | 1.5 |
| 50:50 mixture of isocyanate-modified pentaerythritol triacrylate and the diacrylate of methyl caproate-modified epoxy resin | 0.8 |
| 30:70 mixture of isocyanate-modified pentaerythritol triacrylate and the diacrylate of methyl laurate-modified epoxy resin | 1.3 |

EXAMPLE 16

A letterset ink was prepared from the following:

| | Parts |
|---|---|
| product of Example 9 | 47 |
| solid ketone-aldehyde resin | 9 |
| trimethylolpropane trimethacrylate | 24 |
| 2:4 mixture of Michler's ketone: benzophenone | 6 |
| benzidine yellow | 14 |

The ink was applied to corona-discharge surface-treated polyethylene cups at normal film weight.

The printed substrates were cured by exposure at the rate of 100 cups per minute at a distance of 4½ inches from two 200-watt/inch ultraviolet lamps. The printed polyethylene cups were found to resist antifreeze, alcohol, mineral oils, and other organic solvents. The ink films were also resistant to fingernail scratching.

EXAMPLE 17

A letterpress ink was prepared from the following:

| | Parts |
|---|---|
| product of the reaction of 85 parts of the product of part (A) of Example 1 with 10 parts of toluene diisocyanate | 52 |
| penteareythritol tetraacyrlate | 24 |
| powdered polyethylene wax | 4 |
| 5:1 mixture of benzil:benzoin ethyl ether | 6 |
| phthalocyamine blue | 14 |

The product was printed onto 60-pound coated letterpress paper at normal film weight.

The printed substrate was cured by exposure at a speed of 200 feet per minute at a distance of 1½ inches from a 200-watt/inch ultraviolet lamp. The prints were resistant to moderate rubbing immediately afer printing and after 2 hours could withstand 200 rubs with a 4-pound weight on a Sutherland Rub Tester.

EXAMPLE 18

The procedure of Example 17 was repeated except that a soybean oil-modified epoxy resin ester was used instead of the linseed oil-modified epoxy resin ester. The results were comparable.

EXAMPLE 19

A sheet-fed offset ink was prepared from the following:

| | Parts |
|---|---|
| product of Example 3 | 64 |
| powdered polyethylene wax | 3 |
| tall oil ester of benzoic acid (as tack reducer) | 9 |
| 2:4 mixture of trichloroacetophenone:benzophenone | 6 |
| permanent red 2B pigment | 18 |

The product was printed onto 100-pound coated enamel offset stock at normal film weight.

The printed substrate was cured by exposure at a line speed of 200 feet per minute at a distance of 4½ inches from two 200-watt/inch ultraviolet lamps. The prints were resistant to moderate rubbing immediately after printing and after 2 hours could withstand 200 rubs with a 4-pound weight on a Sutherland Rub Tester.

EXAMPLE 20

A coating composition was prepared from the following:

| | Parts |
|---|---|
| product of part (A) of Example 1 | 25 |
| 1,6-hexanediol diacrylate | 70 |
| trichloroacetophenone | 5 |

The composition was applied with a No. 8 Mayer Bar to each of the following substrates: tin-free steel, aluminum, black iron, copper, clay-coated box board, vinyl-sized aluminum foil board, and corona-discharge surface-treated polyethylene film. The coated substrates were irradiated at a speed of 190 feet per minute at a distance of 1½ inch from a 200 watt/inch ultraviolet lamp.

The cured films were resistant to organic solvents and pasteurization, flexible, tough, and very glossy.

EXAMPLE 21

The procedure of Example 20 was repeated with the product of Example 3 instead of the product of part (A) of Example 1. The results were comparable.

EXAMPLE 22

The procedure of Example 20 was repeated with the following:

| | Parts |
|---|---|
| product of Example 3 | 70 |
| neopentyl glycol diacrylate | 8 |
| 3:3 mixture of Michlre's ketone:benzil | 6 |

The results were comparable.

EXAMPLE 23

An adhesive was prepared from the following:

| | Parts |
|---|---|
| product of Example 9 | 40 |
| trimethylolpropane triacrylate | 50 |
| hexachloroparaxylene | 10 |

The product was applied by offset gravure at film weights ranging from 0.5 to 3.0 pounds per ream to each of these substrates: Saran-coated cellophane, polyethylene surface-treated with corona discharge, polyvinylidene dichloride-coated polypropylene, and Mylar. Laminations were made at 150°F. and 50 pounds/inch pressure between cellophane and cellophane, cellophane and polyethylene, cellophane and polypropylene, and polypropylene and Mylar and then cured by exposing them at the rate of 50 feet per minute at a distance of 1 inch from a 1,200-watt/inch ultraviolet lamp. The laminations were successful as evidenced by tear seals having bond strengths of at least 300 grams per inch.

EXAMPLE 24

The procedures of Examples 1–23 were repeated except that instead of being exposed to ultraviolet light the samples were passed on a conveyor belt beneath the beam of a Dynacote 300,000-volt linear electron accelerator at a speed and beam current so regulated as to produce a dose rate of 0.5 megarad.

These systems produced resinous materials of varying degrees of hardness in films from 0.5 to 20 mils thick having tacky surfaces.

EXAMPLE 25

The procedures of Examples 1–23 were repeated except that instead of being exposed to ultraviolet light the samples were exposed to a combination of ultraviolet light and electron beam radiation in a variety of arrangements: ultraviolet light, then electron beam; electron beam, then ultraviolet light; ultraviolet light before and after electron beam; electron beam before and after ultraviolet radiation; and simultaneous electron beam and ultraviolet radiation. The results were comparable.

What is claimed is:

1. A photopolymerizable solvent-free composition which comprises (1) an ester having the structure

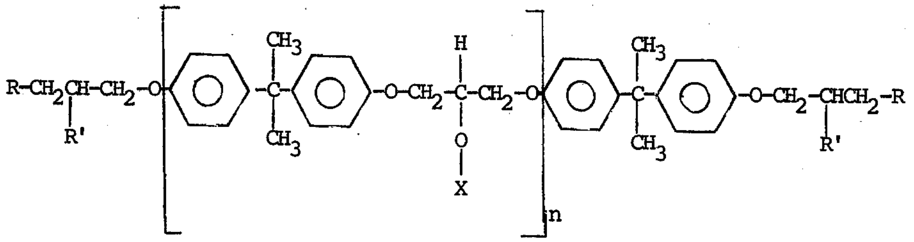

wherein R is a residue of acrylic acid; methacrylic acid; ethacrylic acid; the half esters of itaconic acid, maleic acid, and fumaric acid; sorbic acid; β-phenylacrylic acid; α-cyanoacrylic acid; and cinnamic acid; R′ is

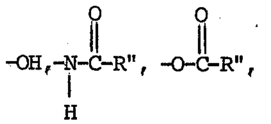

or —OR″; R″ is a lower alkyl or aryl radical; X is a residue of a lower alkyl ester of a fatty acid or of a fatty acid oil; and $n$ is an integer of about 0.2 to 50 and (2) a photoinitiator, the ratio of the ester (1) to the photoinitiator being about 99:1 to 10:90.

2. A photopolymerizable solvent-free printing ink comprising the composition of claim 1 and a colorant.

3. A photopolymerizable solvent-free coating composition which comprises the composition of claim 1.

4. A photopolymerizable solvent-free adhesive which comprises the composition of claim 1.

5. A photopolymerizable solvent-free element comprising a support and a coating thereon of the composition of claim 1.

6. The composition of claim 1 which additionally comprises (3) a monomeric acrylate, methacrylate, itaconate, cinnamate, or sorbate, the ratio of compounds (1):(3) being about 10–90:90–10.

7. The composition of claim 1 wherein the ester (1) has been end-capped with an organic isocyanate.

8. The composition of claim 1 wherein the ester (1) has been end-capped with an anhydride.

* * * * *